United States Patent
Dabak et al.

(10) Patent No.: US 11,359,947 B2
(45) Date of Patent: Jun. 14, 2022

(54) ULTRASONIC TRANSDUCER SYSTEM AND METHOD USING SELECTIVE INTERLEAVED EXCITATION PULSE FREQUENCY

(71) Applicant: TEXAS INSTRUMENTS INCORPORATED, Dallas, TX (US)

(72) Inventors: Anand Dabak, Plano, TX (US); Amardeep Sathyanarayana, Austin, TX (US); Luis Fernando Reynoso, Plano, TX (US); Venkataramanan Ramamurthy, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 416 days.

(21) Appl. No.: 16/537,761

(22) Filed: Aug. 12, 2019

(65) Prior Publication Data
US 2019/0360849 A1    Nov. 28, 2019

Related U.S. Application Data

(63) Continuation of application No. 14/852,005, filed on Sep. 11, 2015, now Pat. No. 10,378,938.

(60) Provisional application No. 62/049,739, filed on Sep. 12, 2014.

(51) Int. Cl.
    *G01F 1/66*    (2022.01)
    *G01F 1/712*   (2006.01)
    *G01F 1/667*   (2022.01)

(52) U.S. Cl.
    CPC ............... *G01F 1/66* (2013.01); *G01F 1/667* (2013.01); *G01F 1/712* (2013.01)

(58) Field of Classification Search
    CPC ............ G01F 1/66; G01F 1/667; G01F 1/712
    See application file for complete search history.

(56) References Cited

U.S. PATENT DOCUMENTS

| | | | |
|---|---|---|---|
| 4,372,168 A | 2/1983 | Watson | |
| 4,527,432 A | 7/1985 | Gutterman | |
| 5,018,114 A | 5/1991 | Mackelburg et al. | |
| 10,378,938 B2* | 8/2019 | Dabak | G01F 1/712 |
| 2016/0080093 A1* | 3/2016 | Dabak | G01F 1/667 |
| | | | 367/140 |
| 2019/0360849 A1* | 11/2019 | Dabak | G01F 1/667 |

* cited by examiner

*Primary Examiner* — Daniel Pihulic
(74) *Attorney, Agent, or Firm* — Ray A. King; Charles A. Brill; Frank D. Cimino

(57) ABSTRACT

In circuitry for applying a pulse train to excite a transducer, the circuitry selects a first set having a first number of pulses at a first frequency and a second set of pulses having a second number of pulses at a second frequency differing from the first frequency. At least one pulse from the first set is located in the pulse train between one or more of the pulses at the second frequency.

22 Claims, 3 Drawing Sheets

ULTRASONIC TRANSDUCER SYSTEM AND METHOD USING SELECTIVE INTERLEAVED EXCITATION PULSE FREQUENCY

CROSS-REFERENCE TO RELATED APPLICATIONS

This application is a continuation of U.S. patent application Ser. No. 14/852,005 filed Sep. 11, 2015, which claims priority to U.S. Provisional Patent Application No. 62/049,739 filed Sep. 12, 2014, the entireties of which are incorporated herein by reference.

BACKGROUND

This relates generally to ultrasonic transducers, and more particularly to a system and method using selective interleaved excitation pulse frequency for such transducers.

Ultrasound transducers are useful for transmitting ultrasound waves and detecting a reflection or echo of the transmitted wave. Such devices are also sometimes referred to as ultrasound or ultrasonic transducers or transceivers. Ultrasound transducers have myriad uses, including as water and gas flow meters, consumer devices, vehicle safety, and medical diagnostics. In these and other fields, signals detected by the transducer may be processed to determine distance, which may be further combined with directional or area processing to determine flow, volume, shape, as well as aspects in connection with two and three dimensional processing, including image processing.

Flow meters (e.g., water or gas) are implemented in various schemes in the prior art, including mechanical, electromagnetic, and ultrasonics. Various degrees of human involvement, design considerations, reliability issues, and the like are often involved in the various approaches. With respect to ultrasonic flow meters, the prior art includes a system that includes a two ultrasonic transducers oriented to communicate signals between one another, with the signal traversing a channel inside a pipe. The velocity, or time of flight (TOF), of the water/gas may thus be determined based in part on a difference of the downstream ultrasonic communication and the upstream ultrasonic communication.

But costs associated with human intervention, such as periodic maintenance, upkeep, and calibration are considerations. Power consumption in electronic equipment also may be an issue, either with the related cost of human intervention to change batteries or, even without human intervention, in the lifespan of the battery given the power consumption of the device(s). Moreover, in an ultrasonic flow meter system, issues arise with the excitation frequency of the communication between transducers. For example, in one approach, a phase-locked loop (PLL) may be used to clock each transducer for its transmitted pulses, but such an approach may be costly to implement and typically a PLL may have an undesirably high power consumption. As another example, in systems without a PLL, often a less-expensive and/or lower power-consuming crystal oscillator is used as a clock source, but relative to a PLL, such a system typically has a coarse set of frequency choices, as it is limited to an integer divisor of the nominal clock frequency. In the case where only integer divisions of this frequency are available, then the available frequencies available to use for exciting a transducer may be somewhat limited, particularly given the desired optimization of the transducers. An example system has nominal frequency of 8 MHz. With integer divisors of that frequency, a relatively small number of different frequencies are available from which to select a frequency to drive the transducers (e.g., 8 MHz/1=8 MHz; 8 MHz/2=4 MHz; 8 MHz/3=2.67 MHz; 8 MHz/4=2 MHz; ... ; 8 MHz/9=0.89 MHz; 8 MHz/7=1.143. MHz, and so forth). More specifically, the receiving side of a transducer has an optimum response when excited by its resonant frequency. Thus, for optimum performance, the transmitting side of a transducer should output that resonant frequency. In the above-noted system with an integer divided clock signal, however, the limited frequencies available for exciting the transducer may not match or be sufficiently close to the desirable resonant frequency.

SUMMARY

In a preferred embodiment, a transducer system includes a transducer and circuitry for applying a pulse train to excite the transducer. The circuitry for applying a pulse train selects a first set having a first number of pulses at a first frequency and a second set of pulses having a second number of pulses at a second frequency differing from the first frequency. At least one pulse from the first set is located in the pulse train between one or more of the pulses at the second frequency.

DETAILED DESCRIPTION OF EXAMPLE EMBODIMENTS

Figure 1:
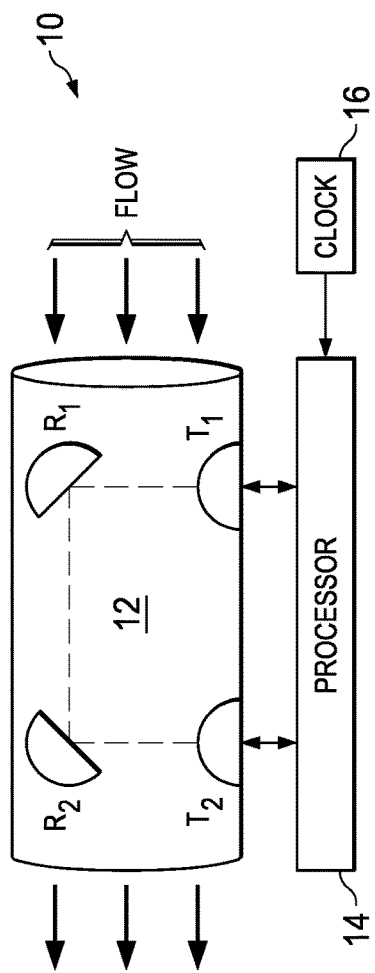
FIG. 1 illustrates a diagram of a flow meter transducer system.

FIG. 1 illustrates a diagram of a flow meter transducer system 10. System 10 as described in this initial paragraph is known, but it also is included and improved upon in connection with the preferred embodiments as described below. System 10 includes a pipe 12 through which a material, such as water or gas, may flow, and for reference in FIG. 1 the flow direction is shown from right to left. Within pipe 12 are located a first transducer $T_1$ and a second transducer $T_2$. Proximate transducer $T_1$ is a reflector $R_1$, and proximate transducer $T_2$ is a reflector $R_2$. Each reflector $R_x$ is oriented so as to communicate a signal from its respective proximate transducer $T_x$ and also to communicate a signal to the other reflector. As shown by a dashed line inside pipe 12 in FIG. 1, therefore, transducer $T_1$ communicates a signal to reflector $R_1$, which reflects that signal to reflector $R_2$, which reflects that signal to transducer $T_2$. Likewise, transducer $T_2$ communicates a signal to reflector $R_2$, which reflects that signal to reflector $R_1$, which reflects that signal to transducer $T_1$. Lastly, a processor 14, such as a digital signal processor, microprocessor, microcontroller, or some other electronic circuitry, receives a signal from a clock 16 and is coupled to both transducer $T_1$ and transducer $T_2$ for exciting either transducer $T_x$ to transmit a signal and to process a correspondingly received signal by the other transducer, as further described below. Clock 16 is typically a low-power (e.g., power consumption ~140 µA/MHz) crystal oscillator with speeds in the range of 1-24 MHz, and nominally (for reference in this description) clock 16 outputs an 8 MHz signal.

Figure 2:
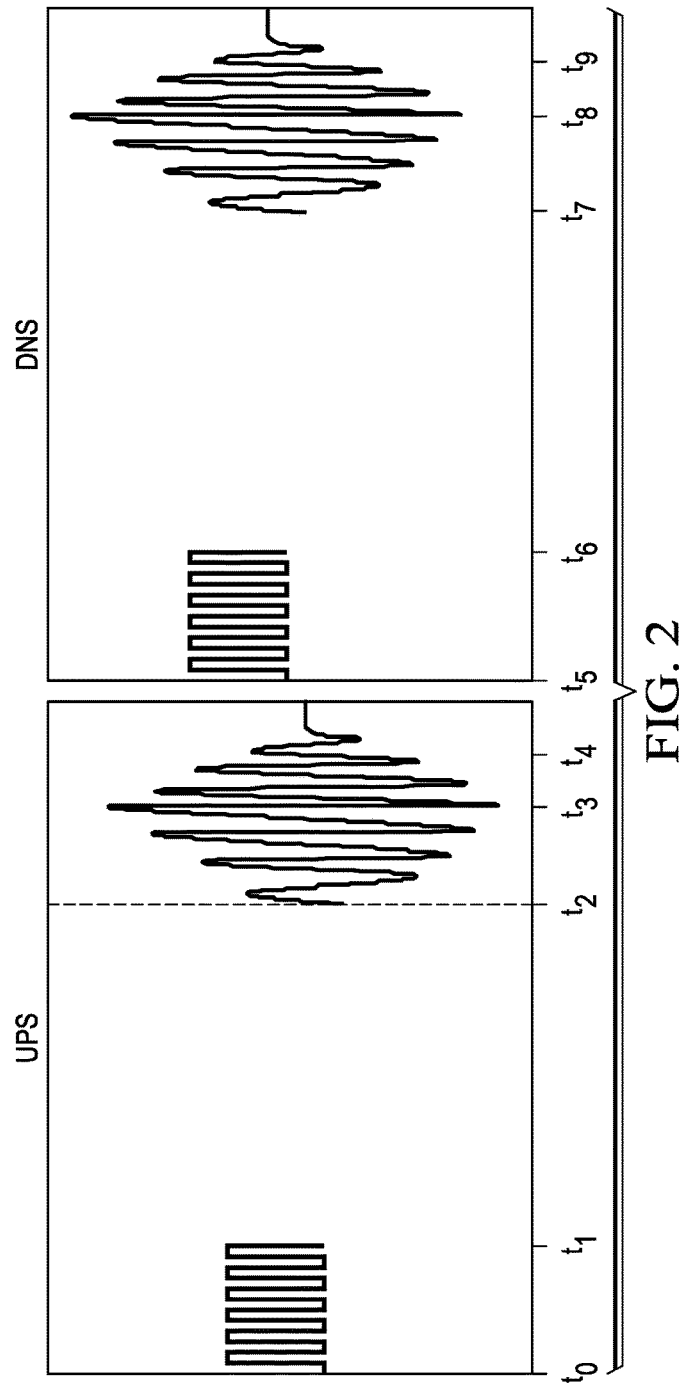
FIG. 2 illustrates a sequence diagram of the flow meter transducer system of FIG. 1.

FIG. 2 illustrates a sequence diagram of the flow meter transducer system 10 of FIG. 1, where the sequence as illustrated and first described is also known, but it also is included and improved upon in connection with the preferred embodiments as described below. In general, FIG. 2 represents a first transmission in a first direction from first transducer $T_1$ to second transducer $T_2$, followed by a second transmission in second direction, opposite the first, from second transducer $T_2$ to first transducer $T_1$. For reference, the first direction is shown and referred to as upstream (UPS) in the context of pipe 12 in FIG. 1, and the second direction is shown and referred to as downstream (DNS) in the context of pipe 12 in FIG. 1.

Looking at the UPS timeline, at a time $t_0$, processor 14, either directly or via additional circuitry (not shown), applies an excitation pulse train to transducer $T_1$ which in response transmits a corresponding ultrasonic pulse train signal, where both the applied and transmitted pulse trains consist of a number of pulses, such as 5 to 20 such pulses, shown beginning therefore at time $t_0$ and ending at time $t_1$. The transmitted pulses are directed to reflector $R_1$, which reflects them to reflector $R_2$, toward transducer $T_2$. Time passes as these signals pass along a channel that includes the portion of the interior of pipe 12, and any material inside that pipe, that is generally along the dashed line shown in FIG. 1. This time is referred to as time of flight (TOF). Thus, the UPS TOF occurs between times $t_0$ and $t_2$.

At time $t_2$, second transducer $T_2$ begins to respond to the pulses transmitted by first transducer $T_1$, as shown by the received signal that begins at time $t_2$. Processor 14, being coupled to second transducer $T_2$, therefore, is operable to sample this received signal, such as at the frequency provided by clock 16. Toward this end, processor 14 is typically programmed to being capturing signals from second transducer $T_2$ at a time slightly before the expected response at time $t_2$. Ideally, the received signal at time $t_2$ will generally increase toward a peak amplitude at time $t_3$ and decay thereafter, as the transmitted pulses create an oscillatory response in, and due to the resistive/inductive/capacitive (RLC) nature of, the receiving transducer $T_2$. Ideally, if the excitation and corresponding transmitted pulses from transducer $T_1$ are at the resonance frequency of the system (which includes both transducers $T_1$ and $T_2$ and the channel between them), then the peak amplitude at time $t_3$ will be at or near the middle of the envelope that surrounds the total received signal. Then, by time $t_4$, the received signal will decay to a zero or non-zero state.

At time $t_5$, which is preferably some time after the amplitude of the received signal at transducer $T_2$ has sufficiently declined, processor 14 reverses the communication direction of system 10, such as via a multiplexer (MUX) operation. Thus, at a later time $t_5$, the above process repeats, but in the reverse (i.e., DNS) direction, which is from second transducer $T_2$ to first transducer $T_1$. From the description above, therefore, at time $t_5$, processor 14 applies an excitation pulse train to second transducer $T_2$ causing it to commence emission of a corresponding pulse train, where both the excitation and resultant transmission pulse train consist of a number of pulses (e.g., 5 to 20) through time $t_6$, directed to reflector $R_2$, which reflects them to reflector $R_1$, toward transducer $T_1$. Following the TOF of these pulses, at time $t_7$, first transducer $T_1$ begins to respond to the pulses transmitted by first transducer $T_2$, with the transducer $T_1$ received signal detected and sampled by processor 14, increasing toward a peak amplitude at time $t_8$, and decaying thereafter to a zero or near-zero level by time $t_9$.

Given the timing of FIG. 2, processor 14 is operable (e.g., via appropriate programming) to determine both the UPS TOF and the DNS TOF.

For example, in one preferred embodiment, UPS TOF and DNS TOF may be determined by cross correlating the received signal waveforms to determine the relative difference of the UPS and DNS TOF. From these measures, the flow rate through pipe 12 may be calculated, based on that relative difference of the UPS and DNS TOF. This calculation may be determined and expressed in various forms, with one example shown in the following Equation 1:

$$v = \frac{L}{2} \times \left(\frac{1}{T_{12}} - \frac{1}{T_{21}}\right) = \frac{L}{2} \times \left(\frac{T_{21} - T_{12}}{T_{21}T_{12}}\right) \quad \text{Equation 1}$$

where,

L is the length of the channel path between first transducer $T_1$ and second transducer $T_2$;

$T_{12}$ is the UPS TOF;

$T_{21}$ is the DNS TOF; and v is the velocity of flow.

Therefore, from Equation 1, flow velocity is directly related to the difference between UPS and DNS TOF. Thus, processor 14 may measure a set of UPS and DNS TOF, or multiple sets, and accordingly determine flow velocity based on those measures.

If flow is in one direction, then the TOF in that direction should be less than the TOF in the opposite direction. Moreover, if pipe 12 has no flow (or is empty), then the UPS and DNS TOF should be equal. Such expectations, however, represent ideal devices and conditions. Various factors will influence these considerations and may cause errors in flow measurement calculations. For example, each of transducers $T_1$ and $T_2$ has a nominal resonance frequency, so that nominally each also should be excited at a frequency at or closest to that frequency, given system availability. However, based on manufacturing variability as well as potential changes over time, the actual resonance frequency of a transducer may depart from its nominal value, thereby creating an impedance mismatch. As a result, exciting one transducer with a signal based on the nominally expected resonant frequency will cause a less than optimal response in the received signal of the other transducer. Aging also may affect each transducer and also the channel in pipe 12, which is necessarily part of the overall bi-directionally analyzed system. For example, sedimentation may form or change, thereby changing the overall system resonance frequency. Once more, therefore, if a non-resonance frequency excitation signal or pulse is transmitted through the system, then the response at the receiving transducer, including its sensitivity to any impedance mismatch between the transmitting and receiving transducer, will be less than optimal and, hence, more prone to measure/detection errors. In view of these considerations and others, the preferred embodiment implement additional improvements in system 10, as further described below.

Figure 3:
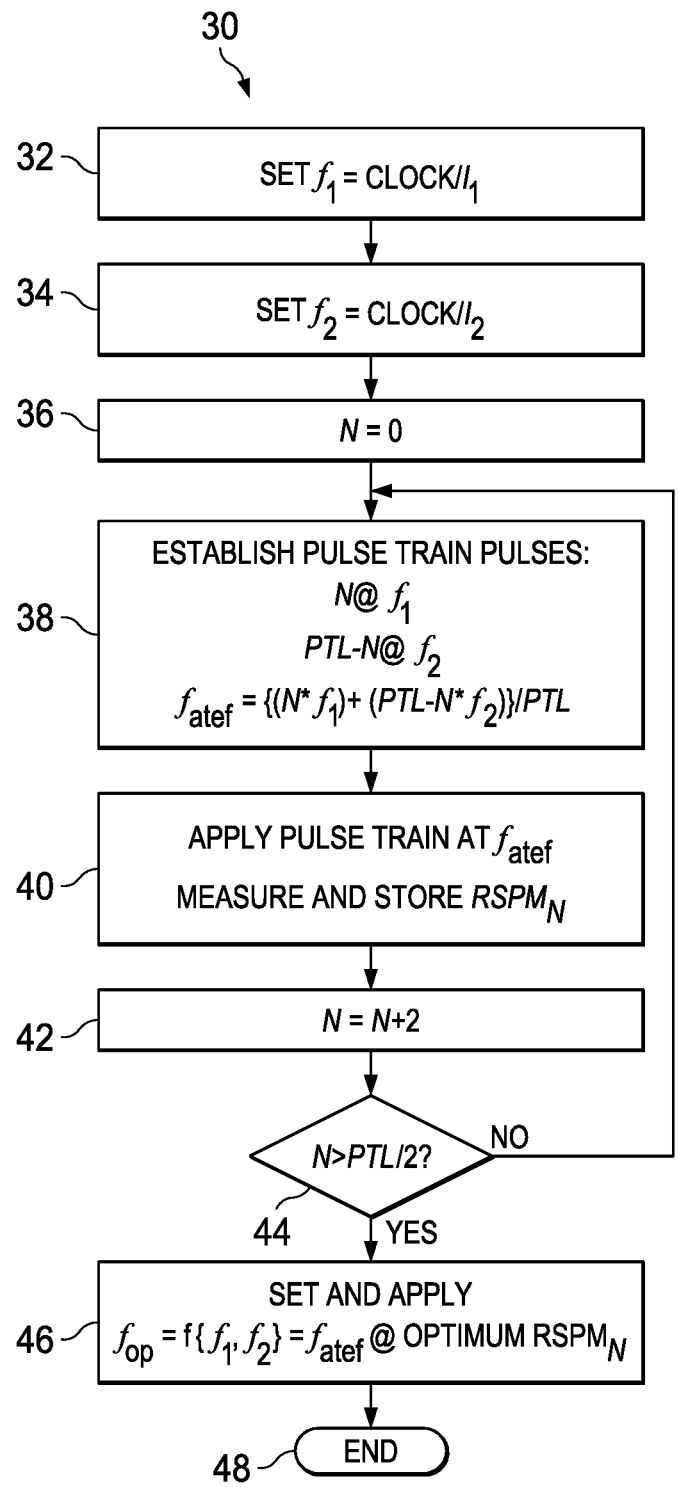
FIG. 3 illustrates a flowchart of a method of operation of the processor of FIG. 1.

FIG. 3 illustrates a flowchart of a method 30 of operation of processor 14 from system 10, as may be implemented with appropriate instructions stored in a computer or computing-device readable media, including hardware, firmware, software, or any combination thereof. By way of introduction, method 30 includes an iterative methodology to identify an optimal excitation frequency for the transducers of system 10, after which that identified frequency is applied in system 10 for flow metering operations. Specifically and as described with respect to FIG. 3, with pipe 12 preferably in a known no-flow state, in each iteration a transducer of system 10 is excited with a pulse train having an average trial excitation frequency, and a received signal performance metric, RSPM, at the other transducer of system 10 is detected. Each iteration involves a different average excitation frequency, and the excitation frequency creating the optimal RSPM is thereafter used for flow metering evaluations as a substance flows through pipe 12. Also, per a preferred embodiment, the pulse train that creates the average trial excitation frequency is created by interleaving at least two different frequencies, as further described below.

Method 30 commences with a step 32, which establishes a first of at least two excitation frequencies, $f_1$. In a preferred embodiment, $f_1$ is obtained by dividing the frequency supplied by clock 16 by an integer $I_1$. In the example of FIG. 1, clock 16 provides an 8 MHz signal, and $I_1=1$ in a first example, so $f_1=8$ MHz. Following step 32 is a comparable step 34, which however applies to the second of the at least two excitation frequencies, $f_2$. In a preferred embodiment, $F_2$ also is obtained by dividing the frequency supplied by clock 16 by an integer, here designated as $I_2$ and unequal to $I_1$. For this first example, $I_2=7$, so $f_2=8$ MHz/$7=1.143$ MHz.

After step 34, an initialization step 36 sets a loop variable $N=0$, so as to control the number of above-introduced iterations, each of which will involve a different average trial excitation frequency.

After step 36, step 38 establishes a pulse train for application to a transducer, the train consisting of an integer number PTL of pulses, and where some of those PTL pulses are selected at frequency $f_1$ and the remainder of the PTL pulses are selected at frequency $f_2$. In the context of method 30, the differing number of pulses at frequency $f_1$ versus at frequency $f_2$ are determined using the loop variable N, whereby for each instance of the loop, the pulse train includes N pulses at frequency $f_1$ and PTL-N pulses at frequency $f_2$. In an example, therefore, PTL=20, so the transducer pulse train is to include 20 pulses. In a first iteration of step 38, therefore, where N=0 and PTL=20, then the pulse train includes N=0 pulses at frequency $f_1$ and PTL-N=(20-0=20) pulses at frequency $f_2$ These pulses combine to provide an average trial excitation frequency, which is $f_{atef}$, as shown in the following Equation 2:

$$f_{atef} = \frac{\{N(f_1) + (PTL-N)(f_2)\}}{PTL} \quad \text{Equation 2}$$

Thus, in the first iteration of step 36, the average trial excitation frequency $f_{atef}$ is as shown in the following Equation 2.1:

$$f_{atef} = \frac{\{0(1) + (20-0)(1.143)\}}{20} = 1.143 \text{ MHz} \quad \text{Equation 2.1}$$

After step 38, step 40 applies the pulse train to one of the two transducers $T_1$ or $T_2$ of system 10, preferably with pipe 12 having the material (e.g., gas/water) in it known or detected not to be moving, as the response should be the same in either direction under such conditions. By way of example, therefore, processor 14 may accomplish step 38 by selecting the appropriate integer divisor for each pulse in the determined pulse train. In the present example of the first iteration of step 38, therefore, where the pulse train includes N=0 at frequency $f_1$ and PTL-N=(20-0=20) pulses at frequency $f_2$, then processor 14 selects the 20 pulses at frequency $f_2$ by using its integer divisor $I_2=7$, whereby each pulse is therefore is 1.143 MHz (i.e., 8 MHz/7=1.143 MHz). In an alternative preferred embodiment, method 30 may be repeated for both upstream and downstream determinations, with the difference in TOF also being used for the remaining discussion. In any event, as the pulse train is supplied to excite the selected transducer (i.e., $T_1$ or $T_2$), the received signal at the other non-selected transducer (i.e., $T_2$ or $T_1$) is measured and the above-introduced receive signal performance metric (RSPM) of the respective receive signal is determined and stored. For example, the RSPM may be a measure of the maximum amplitude of the received signal. As another example, if step 40 is applied in both the upstream and downstream directions, then the RSPM may be the delta TOF with respect to the two different directional measures.

After step 40, step 42 increases the loop counter N, which in one preferred embodiment is by a value of two so that the loop counter will continue to present an even number for step 38, as further explained later.

After step 42, step 44 determines whether the loop counter has exceeded a threshold, which is set to PTL/2, which is the pulse train length divided by two. For the example wherein PTL=20, therefore, step 44 determines whether N>20/2=10. If N does not exceed PTL/2, then method 30 returns to step 38, where as described below a loop portion of method 30 repeats for a determination of a next and different average trial excitation frequency $f_{atef}$, which is applied to a transducer and a next RSPM is measured and stored, continuing in that loop until N exceeds PTL/2. Toward that end, when N eventually exceeds PTL/2, then method 30 continues to step 46.

In step 46, and as further illustrated by an example below, method 30 has performed a number (e.g., (PTL/2)+1) of loops, and for each loop a respective frequency $f_{atef}$ is applied and a respective RSPM is measured and stored. In step 46, therefore, the stored values of RSPM are evaluated, and an operational frequency $f_{op}$, which is a function of $f_1$ and $f_2$, is set to achieve the frequency $f_{atef}$ at which the optimum value of RSPM was achieved, which is shown in step 46 by the following Equation 3:

$$f_{op}=f\{f_1,f_2\}=f_{atef}@\text{OPTIMUM}\{RSPM\} \quad \text{Equation 3}$$

Therefore, operational frequency $f_{op}$ is determined as that frequency combination, among the various trial and stored values of frequency $f_{atef}$, at which the best system performance was achieved, as that measure is indicated by RSPM. In other words, the best measured frequency value corresponds to that excitation frequency combination of $f_1$ and $f_2$ that provided, in a received signal from a transducer, the most optimum response, which also is likely to be the excitation frequency that was closest to the resonant frequency of system 10. Method 30, therefore, represents an iterative methodology to converge on an optimum excitation frequency among frequencies achievable by a combination of frequencies $f_1$ and $f_2$, provided from integer divisions of a clock signal. These and other aspects are further demonstrated below, including a preferred manner of interleaving the $f_1$ and $f_2$, pulses into a pulse train. In any event, after the combination of $f_1$ and $f_2$ that provides the operational frequency $f_{op}$ is determined, those frequencies are thereafter applied by system 10 in an interleaved fashion to achieve the effective operational excitation frequency for transducers $T_1$ and $T_2$, as method 30 is thus shown to end in step 48.

The iterative loop is described above in connection with applying a pulse train and detecting the response in a single direction, which is either upstream or downstream. In one preferred embodiment, such single directionally should suffice if only maximizing the amplitude by optimizing the average excitation frequency. In an alternative preferred embodiment, however, it is recognized that impedance mismatches may result in a respective different optimum frequency in the two different directions (i.e., UPS and DNS). Such a condition may suggest that the impedance mismatch is undesirably high, but nevertheless a preferred embodiment contemplates performing the loop in both directions and using delta TOF as the basis for determining the combination of $f_1$ and $f_2$ that provides the operational frequency $f_{op}$.

From the above, method 30 performs an iterative methodology to arrive at an optimal operational frequency $f_{op}$ for system 10. In this respect, system 10 is auto-calibrating. Moreover, a preferred embodiment may preferably repeat this auto-calibration of method 30 from time to time or based on other factors. For example, method 30 may repeat each time a fixed period of time elapses (e.g., once per 24 hour period), or based on a changing time, or in response to an anticipated or detected change in one or more conditions affecting system 10.

To further appreciate the preceding, the discussion now continues with additional iterations through the loop portion of method 30, as it repeats and ultimately completes after the threshold condition of step 44 is satisfied. The first iteration of this loop, when N=0, results in a trial excitation frequency $f_{atef}$ as shown in Equation 2.1, of 1.143 MHz and a first measure of RSPM, which herein has a subscript equal to N for the value, so in this first instance that measure is referred to as $RSPM_0$. Also, step 42 increases the loop counter to N=2, and threshold detection step 44 is not satisfied (i.e., N=2≤(PTL=20/2=10)) so the loop is repeated, as described below.

For the N=2 loop iteration of method 30, step 38 again establishes a transducer pulse train of an integer number PTL (e.g., PTL=20) of pulses, where in this instance the pulse train includes a number of frequency $f_1$ pulses, referred to herein as $NP_{f1}$ that in this instance equals $N=2f_1$ pulses, and a number of frequency $f_2$ pulses, referred to herein as $NP_{f2}$, that in this instance equals PTL−N=20−2=18 $f_2$ pulses. These pulses combine to provide the average trial excitation frequency, $f_{atef}$ as shown in the following Equation 2.2:

$$f_{atef} = \frac{\{2(1) + (20 - 2)(1.143)\}}{20} = 1.286 \text{ MHz} \quad \text{Equation 2.2}$$

Step 40, therefore, applies the pulse train which selects N=2 frequency $f_1$ pulses and PTL−N=20−2=18 frequency $f_2$ pulses to one of the two transducers $T_1$ or $T_2$ (or alternating, to one after the other, for a delta TOF application). Further in this regard, the preferred embodiment combines the frequency $f_1$ and frequency $f_2$ pulses by selecting and applying them in an interleaved fashion so that the PTL pulses of the pulse train do not include all of the frequency $f_1$ pulses followed by all of the frequency $f_2$ pulses (or vice versa), but preferably individual ones of one frequency pulses are interspersed among the others. Indeed, where the lower number $NP_{f1}$ or $NP_{f2}$ of the frequency $f_1$ pulses or the frequency $f_2$ pulses, respectively, is a factor of PTL, then preferably each of those pulses corresponding to lower number is equally-spaced or symmetrically spaced in an interleaving fashion with respect to the larger number of the other pulses, as will now be appreciated a numeric example in the present loop iteration. Specifically, for the current loop iteration, $NP_{f1}$=2 $f_1$ pulses, $NP_{f2}$=18 $f_2$ pulses, and the lower number of those pulses (i.e., 2) is a factor of PTL=20. Hence, in the pulse train, for every instance of an $f_1$ pulse, the number of $f_2$ trailing pulses ($NPT_{f2}$ herein) following the $f_1$ pulse is shown by the following Equation 4:

$$NPT_{f2} = \frac{PTL - N}{N} \quad \text{Equation 4}$$

Equation 4 for the current loop iteration is shown in the following Equation 4.1:

$$NPT_{f2} = \frac{PTL - N}{N} = \frac{20 - 2}{2} = \frac{18}{2} = 9 \quad \text{Equation 4.1}$$

Thus, for the current loop iteration, step 40 applies an instance of an $f_1$ pulse followed by $NPT_{f2}$=9 $f_2$ pulses. Moreover, this sequence of 20 pulses, one at 2 MHz followed by 9 at 1.143 MHz, results in an average trial excitation frequency $f_{atef}$ is as shown in the following Equation 2.3:

$$f_{atef} = \frac{\{2(1) + (20 - 2)(1.143)\}}{20} = 1.129 \text{ MHz} \quad \text{Equation 2.3}$$

Figure 4A:
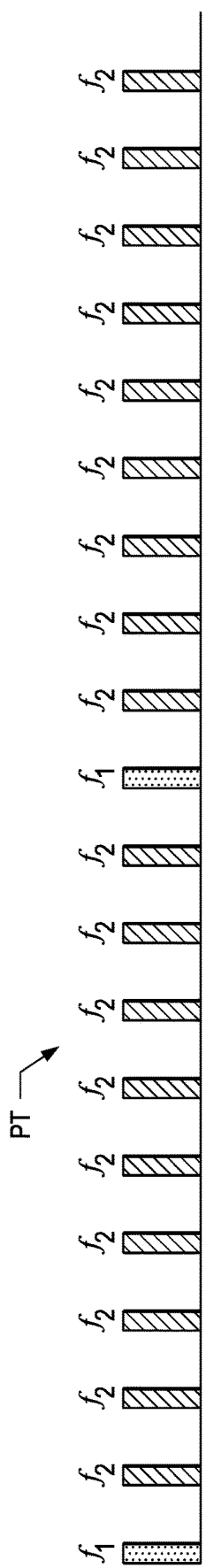
FIG. 4a illustrates a preferred embodiment pulse train to excite a transducer with 20 pulses, wherein a first pulse at one frequency is interleaved before nine pulses at another frequency.

FIG. 4a, therefore, illustrates one such approach with a preferred embodiment pulse train PT of PTL=20 pulses, with $NP_{f1}$=2 $f_1$ pulses, each of which is followed by $NP_{f2}$=9 $f_2$ pulses, so FIG. 4a uses shading to distinguish the two different frequency pulse types, and the $f_2$ pulses are slightly narrower than the $f_2$ pulses. Thus, a first set of 10 pulses is shown starting from left to right, which commence with one $f_1$ pulse followed by nine $f_2$ pulses, followed by a second set of 10 pulses which likewise includes one $f_1$ pulse followed by nine $f_2$ pulses. Each set, or both sets, therefore, result in a trial excitation frequency $f_{atef}$ of 1.129 MHz applied to a selected transducer (or to both, with one excited after the other). Moreover, for pulse train PT, step 40 also evaluates and stores $RSPM_2$, after which the loop counter N is increased by 2 to 4, and again step 44 is not satisfied (i.e., N=4≤(PTL=20/2=10)), so the loop is repeated, as described below.

Figure 4B:
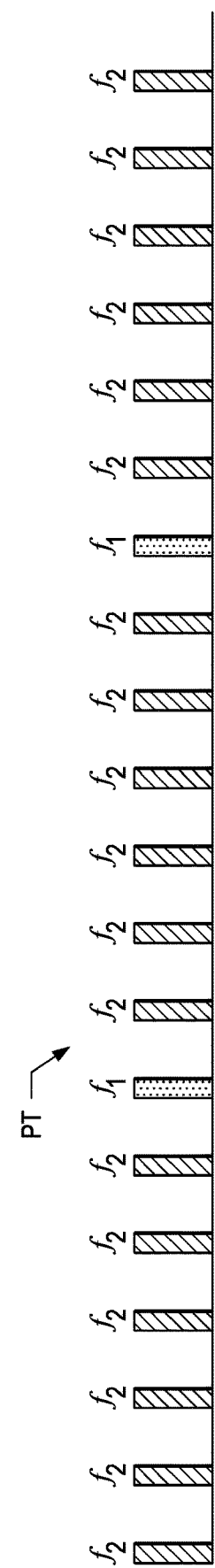
FIG. 4b illustrates a preferred embodiment pulse train, as an alternative to FIG. 4a, to excite a transducer with 20 pulses, in which two pulses at one frequency are symmetrically interleaved with respect to eighteen pulses at another frequency.

As an alternative and a more preferred approach in some instances, the results of Equation 4 may be applied to create the pulse train so that the lower number of pulses as between $f_1$ and $f_2$, out of the total 20 pulses, is symmetrically distributed with respect to the center of the total pulse train, rather from the start. This approach, for the current example, is shown in FIG. 4b, where again per Equation 4.1 there are 20 total pulses, 2 of which is at $f_1$ and 18 of which are at $f_2$, but the pulse train begins with six $f_1$ pulses, followed by an $f_2$ pulse, followed by six $f_1$ pulses, followed by an $f_2$ pulse, followed by six $f_1$ pulses. In this regard, the response of the transducer is allowed to more smoothly build up with the $f_1$ pulses and then be slightly adjusted by the averaging effect of the symmetrically-interleaved $f_2$ pulse.

For the N=4 loop iteration of method 30, step 38 again establishes a transducer pulse train PT of an integer number PTL (e.g., PTL=20) of pulses, where in this instance pulse train PT includes $NP_{f1}$=N=4 pulses at frequency $f_1$ and $NP_{f2}$=PTL−N=20−4=16 pulses at frequency $f_2$. These pulses combine to provide the average trial excitation frequency, $f_{atef}$, as shown in the following Equation 2.4:

$$f_{atef} = \frac{\{4(1) + (20-4)(1.143)\}}{20} = 1.114 \text{ MHz} \qquad \text{Equation 2.4}$$

Step 40, therefore, applies the pulse train of N=4 frequency $f_1$ pulses and PTL−N=20−4=16 frequency $f_2$ pulses to one of the two transducers $T_1$ or $T_2$ (or alternating to one excited after the other, for a delta TOF application). Again, because the lower number, $PN_{f1}$=4 is a factor of PTL=20, then preferably each frequency pulse in that lower number of pulses is equally-spaced in an interleaving fashion with respect to the other higher number of $f_2$ pulses. Thus, for the current loop iteration, there are $NP_{f1}$=4 $f_1$ pulses and $NP_{f2}$=16 $f_2$ pulses, so in the pulse train, for every instance of an $f_1$ pulse, the number $NP_{f2}$ of $f_2$ pulses is shown by the following Equation 4.2:

$$NP_{f2} = \frac{PTL - N}{N} = \frac{20-4}{4} = \frac{16}{4} = 4 \qquad \text{Equation 4.2}$$

Figure 5:
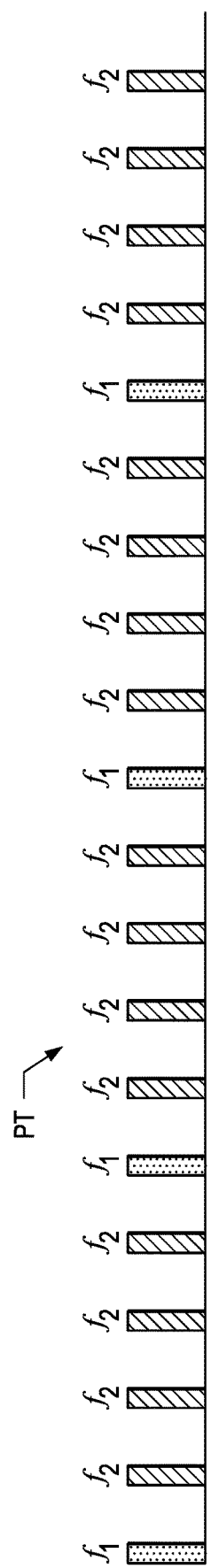
FIG. 5 illustrates a preferred embodiment pulse train to excite a transducer with 20 pulses, in which a first pulse at one frequency is interleaved before four pulses at another frequency.

Thus, for the current loop iteration, step 40 applies an instance of an $f_1$ pulse followed by $NP_{f2}$=4 $f_2$ pulses. FIG. 5, therefore, illustrates the preferred embodiment pulse train PT of PTL=20 pulses, with N=$NP_{f1}$=4 $f_1$ pulses, each of which is followed by $NP_{f2}$=4 $f_2$ pulses, resulting in a trial excitation frequency $f_{atef}$ of 1.142 MHz applied to a selected transducer (or to both, with one excited after the other). Moreover, for that pulse train PT, step 40 also evaluates and stores $RSPM_4$, after which the loop counter N is increased by two to so as to equal six, and again step 44 is not satisfied (i.e., N=6≤(PTL=20/2=10)), so the loop is repeated, as described below.

In view of the description above, method 30 is applicable for the N=6 loop iteration of method 30 and subsequent loop iterations. Also, for the N=6 loop iteration, $NP_{f1}$=N=6 $f_1$ pulses, and $NP_{f2}$=PTL−N=20−6=14 $f_2$ pulses. Therefore, neither $NP_{f1}$ nor $NP_{f2}$ is a factor of PTL, so neither 6 nor 14 is a factor of 20. As a result, the $f_1$ pulses cannot be evenly spaced relative to the $f_2$ pulses. In one preferred embodiment, therefore, the smaller number of pulses (e.g., $f_1$ pulses in this example) are still interleaved among the larger number of pulses; accordingly, in the pulse train, at least one or more of the pulses at one frequency are located between one or more of the pulses at the other frequency, just not in an equally-spaced manner. Using this approach, therefore, if method 30 loops for each increase of the index N by 2, then odd numbers of pulses in either $NP_{f1}$ or $NP_{f2}$ are avoided. In view of the description above, the following Table 1 depicts each different loop and the resultant value of average trial excitation frequency, $f_{atef}$, where $f_1$=8 MHz/8=1.0 MHz and $f_2$=8 MHz/7=1.143 MHz:

TABLE 1

| $NP_{f1}$ | $NP_{f2}$ | $f_{atef}$ | RSPM |
|---|---|---|---|
| 0 | 20 | 1.142857143 | $RSPM_0$ |
| 2 | 18 | 1.128571429 | $RSPM_2$ |
| 4 | 16 | 1.114285714 | $RSPM_4$ |
| 6 | 14 | 1.1 | $RSPM_6$ |
| 8 | 12 | 1.085714286 | $RSPM_8$ |
| 10 | 10 | 1.071428571 | $RSPM_{10}$ |
| 12 | 8 | 1.057142857 | $RSPM_{12}$ |
| 14 | 6 | 1.042857143 | $RSPM_{14}$ |
| 16 | 4 | 1.028571429 | $RSPM_{16}$ |
| 18 | 2 | 1.014285714 | $RSPM_{18}$ |
| 20 | 0 | 1 | $RSPM_{20}$ |

Table 1, therefore, demonstrates that method 30 creates and applies a different respective pulse train for a total of (PTL/2)+1 instances, each at a different average trial excitation frequency $f_{atef}$; also for each of those instances, method 30 determines a respective receive signal performance metric RSPM for each such instance. Thus, after the method iteration loops are complete, step 46 selects the combination of values of $f_1$ and $f_2$ corresponding to the respective optimized RSPM per Equation 3, and thereafter those values are combined using interleaving pulses of each to achieve the optimized effective operation frequency, $f_{op}$.

In an alternative preferred embodiment, the loop index N of method 30 is adjusted so that only values of N are used where either N or PTL−N is a factor of PTL, so that for each such instance each pulse in the lower number of one frequency is equally-spaced in an interleaving fashion with respect to one or more pulses in the larger number of the other frequency pulses. The threshold condition of step 44 also would be adjusted accordingly (e.g., N>number of instances where one of N or PTL−N is a factor of PTL). In this approach, therefore, the following Table 2 depicts each different loop and the resultant value of average trial excitation frequency, $f_{atef}$, and the appropriate equally-spaced interleaving, as established for each iteration by Equation 4:

TABLE 2

| $NP_{f1}$ | $NP_{f2}$ | $f_{atef}$ | $NPT_{f2}$ | $NPT_{f1}$ | RSPM |
|---|---|---|---|---|---|
| 0 | 20 | 1.142857143 | 20 | | $RSPM_0$ |
| 2 | 18 | 1.128571429 | 9 | | $RSPM_2$ |
| 4 | 16 | 1.114285714 | 4 | | $RSPM_4$ |
| 10 | 10 | 1.071428571 | 1 | | $RSPM_{10}$ |
| 16 | 4 | 1.028571429 | | 4 | $RSPM_{16}$ |
| 18 | 2 | 1.014285714 | | 9 | $RSPM_{18}$ |
| 20 | 0 | 1 | | 20 | $RSPM_{20}$ |

Table 2, therefore, illustrates only values of N=$NP_{f1}$ where the lower of either $NP_{f1}$ or $NP_{f2}$ is a factor of PTL=20. For the first four loop iterations of method 30, therefore, the total PTL=20 pulse train includes a pulse at frequency $f_1$ followed by one or more trailing $NPT_{f2}$ pulse(s) at frequency $f_2$. For the last three loop iterations of method 30, as shown in the last three rows of Table 2, however, the number $NP_{f2}$ of frequency $f_2$ pulses exceeds the number $NP_{f1}$ of $f_1$ pulses. In each of those iterations, therefore, the pulse train includes a pulse at frequency $f_2$ followed by one or more trailing $NPT_{f1}$ pulse(s) at frequency $f_1$. Thus, the approach of Table 2 does not include the fully (PTL/2)+1 values of Table 1, but each of its combinations provides for an equally-spaced interleaving as between the $f_1$ pulses and the $f_2$ pulses of a respective combination.

In still another preferred embodiment, the loop index N may be adjusted (along with the threshold of step 44) to include more or fewer combinations of the $f_1$ pulses and the $f_2$ pulses. Thus, by increasing the loop index N in step 42 by one rather than two, the following Table 3 is achieved.

TABLE 3

| $NP_{f1}$ | $NP_{f2}$ | $f_{atef}$ | RSPM |
|---|---|---|---|
| 0 | 20 | 1.142857 | $RSPM_0$ |
| 1 | 19 | 1.135714 | $RSPM_1$ |
| 2 | 18 | 1.128571 | $RSPM_2$ |
| 3 | 17 | 1.121429 | $RSPM_3$ |
| 4 | 16 | 1.114286 | $RSPM_4$ |
| 5 | 15 | 1.107143 | $RSPM_5$ |
| 6 | 14 | 1.1 | $RSPM_6$ |
| 7 | 13 | 1.092857 | $RSPM_7$ |
| 8 | 12 | 1.085714 | $RSPM_8$ |
| 9 | 11 | 1.078571 | $RSPM_9$ |
| 10 | 10 | 1.071429 | $RSPM_{10}$ |
| 11 | 9 | 1.064286 | $RSPM_{11}$ |
| 12 | 8 | 1.057143 | $RSPM_{12}$ |
| 13 | 7 | 1.05 | $RSPM_{13}$ |
| 14 | 6 | 1.042857 | $RSPM_{14}$ |
| 15 | 5 | 1.035714 | $RSPM_{15}$ |
| 16 | 4 | 1.028571 | $RSPM_{16}$ |
| 17 | 3 | 1.021429 | $RSPM_{17}$ |
| 18 | 2 | 1.014286 | $RSPM_{18}$ |
| 19 | 1 | 1.007143 | $RSPM_{19}$ |
| 20 | 0 | 1 | $RSPM_{20}$ |

Given Table 3, again combinations are included in certain rows wherein neither $NP_{f1}$ nor $NP_{f2}$ is a factor of PTL, giving rise to unequally-spaced interleaving of the $f_1$ pulses and the $f_2$ pulses for purposes of applying a trial pulse train and also for applying the operational frequency if one of such combinations produces an optimized RSPM. Greater granularity or resolution selection is achievable as between each different combined frequency, namely, an approximate difference of 0.007 MHz is achievable for attempting to match the resonant frequency of system 10. Thus, tradeoffs exist in the various approaches represented by Tables 1 through 3.

In the description above, the preferred embodiments are shown to provide a transducer system and method using selective interleaved excitation pulse frequency for such transducers. The preferred embodiments have been shown in a favorable implementation with respect to flow meters, but numerous aspects may apply to other systems. For example, preferred embodiment aspects may be applied to transducer applications other than flow meters. As another example, the preferred embodiment is shown by example in a system with two transducers, but various aspects also may be applied to a single transducer, wherein it is excited with a frequency and transmits a pulse train, after which it then responds to the reflection of that pulse train. As still another example, the integer divisors used above are only by way of example, where alternative values may be used so as to achieve different values of $f_{atef}$. As yet another example, while the preferred embodiment implements $f_{atef}$ as the combination of two different frequencies, more than two such frequencies may be combined and interleaved so as to achieve additional resolution.

Modifications are possible in the described embodiments, and other embodiments are possible, within the scope of the claims.

What is claimed is:

1. A system, comprising:
    a transducer;
    a first reflector proximate to the transducer, the reflector oriented to communicate with the transducer;
    a second reflector oriented to communicate with the first reflector;
    a clock circuit configured to provide a clock signal; and
    circuitry coupled to the transducer and to the clock circuit, the circuitry configured to: by integer division of the clock signal, form a first set of pulses having a first frequency, and form a second set of pulses having a second frequency differing from the first frequency; and
    apply a pulse train to excite the transducer, the pulse train comprising at least one pulse from the first set between two or more pulses from the second set.

2. The system of claim 1, wherein the transducer is a first transducer configured to produce a transmitted signal in response to the pulse train, and the system further comprising a second transducer proximate the second reflector, the second transducer configured to produce a received signal in response to the transmitted signal.

3. The system of claim 2, further comprising circuitry configured to determine a performance metric in response to the received signal produced by the second transducer.

4. The system of claim 2, wherein: the pulse train is a first pulse train; and the circuitry is configured to apply a second pulse train to excite the transducer, the first pulse train having a different number of pulses at the first frequency as compared to the second pulse train.

5. The system of claim 4, wherein the first pulse train has a different number of pulses at the second frequency as compared to the second pulse train.

6. The system of claim 5, further comprising circuitry configured to determine a respective performance metric in response to the received signal produced by the second transducer responsive to at least one of the first and second pulse trains.

7. The system of claim 1, wherein: the transducer is a first transducer configured to produce a transmitted signal in response to the pulse train; and the system further comprises a second transducer positioned and configured to produce a first received signal in response to the transmitted signal from the first transducer; and the first transducer is positioned and configured to produce a second received signal in response to a transmitted signal from the second transducer.

8. The system of claim 1, wherein the at least one pulse from the first set is located in the pulse train in an evenly-spaced arrangement between the two or more pulses from the second set.

9. A system, comprising:
    a first transducer configured to produce transmitted signals in response to first and second pulse trains;
    a first reflector proximate to the first transducer, the reflector oriented to communicate with the first transducer;
    a second reflector oriented to communicate with the first reflector;
    a second transducer proximate to the second reflector, the second transducer configured to produce received signals in response to the transmitted signals;
    circuitry coupled to the second transducer and configured to determine a respective performance metric in response to at least one of the received signals produced by the second transducer; and
    circuitry coupled to the first transducer and configured to: select a first set of pulses at a first frequency and a second set of pulses at a second frequency differing from the first frequency; and apply first and second pulse trains to excite the first transducer, each of the first and second pulse trains having at least one pulse from the first set between two or more pulses from the second set;

the first pulse train having a different number of pulses at the first frequency as compared to the second pulse train, and a different number of pulses at the second frequency as compared to the second pulse train, in response to an optimum performance metric indicated from the respective performance metric.

10. The system of claim 9, wherein the circuitry coupled to the first transducer is configured to apply the first and second pulse trains to excite the first transducer repeatedly at fixed periodic times.

11. The system of claim 10, wherein the fixed periodic times are separated by approximately 24 hours.

12. The system of claim 11, wherein: the pulse train is a first pulse train; and the circuitry is configured to apply a second pulse train to excite the second transducer.

13. A system, comprising:
a first transducer configured to produce a transmitted signal in response to a pulse train;
circuitry coupled to the first transducer and configured to:
select a first set of pulses having a first frequency and a second set of pulses having a second frequency differing from the first frequency; and apply the pulse train to excite the first transducer, in which the pulse train comprises at least one pulse from the first set between two or more pulses from the second set;
a first reflector proximate to the first transducer, the reflector oriented to communicate with the first transducer;
a second reflector oriented to communicate with the first reflector;
a second transducer proximate to the second reflector, the second transducer configured to produce a received signal in response to the transmitted signal; and
a pipe that includes the first transducer, the second transducer, the first reflector and the second reflector;
the first transducer and the second transducer being positioned so flow in the pipe is measurable in response to the received signal.

14. A method of operating a transducer system, the method comprising:
applying a pulse train to excite a first transducer to produce a transmitted signal in response to the pulse train, wherein applying the pulse train comprises selecting a first set of pulses having a first frequency and a second set of pulses having a second frequency differing from the first frequency, in which the pulse train comprises at least one pulse from the first set between two or more pulses from the second set, the first and second sets being selected in response to an optimum performance metric;
receiving the transmitted signal from the first transducer at a first reflector, and retransmitting the transmitted signal;
receiving the transmitted signal from the first reflector at a second reflector, and retransmitting the transmitted signal; and
receiving the transmitted signal from the second reflector at a second transducer.

15. The method of claim 14, further comprising determining a performance metric in response to the received signal produced by the second transducer.

16. The method of claim 14, wherein: applying the pulse train comprises applying first and second pulse trains; and the first pulse train has a different number of pulses at the first frequency as compared to the second pulse train.

17. The method of claim 16, wherein the first pulse train has a different number of pulses at the second frequency as compared to the second pulse train.

18. The method of claim 17, further comprising determining a respective performance metric in response to the received signal produced by the second transducer responsive to at least one of the first and second pulse trains.

19. A method of operating a transducer system, the method comprising:
producing, by a first transducer, transmitted signals in response to first and second pulse trains;
receiving the transmitted signals from the first transducer at a first reflector, and retransmitting the transmitted signals;
receiving the transmitted signals from the first reflector at a second reflector, and retransmitting the transmitted signals;
producing, by a second transducer, received signals in response to the transmitted signals;
determining a respective performance metric in response to at least one of the received signals produced by the second transducer;
selecting a first set of pulses at a first frequency and a second set of pulses at a second frequency differing from the first frequency; and
applying first and second pulse trains to excite the first transducer, each of the first and second pulse trains having at least one pulse from the first set between two or more pulses from the second set;
the first pulse train having a different number of pulses at the first frequency as compared to the second pulse train, and a different number of pulses at the second frequency as compared to the second pulse train, in response to an optimum performance metric indicated from the respective performance metric.

20. A system, comprising:
a transducer;
a first reflector proximate to the transducer, the reflector oriented to communicate with the transducer;
a second reflector oriented to communicate with the first reflector; and
circuitry coupled to the transducer and configured to: in response to an optimum performance metric, select a first set of pulses having a first frequency and a second set of pulses having a second frequency differing from the first frequency; and apply a pulse train to excite the transducer, the pulse train comprising at least one pulse from the first set between two or more pulses from the second set.

21. The system of claim 20, wherein the circuitry coupled to the transducer is configured to apply the pulse train to excite the transducer repeatedly at fixed periodic times.

22. The system of claim 21, wherein the fixed periodic times are separated by approximately 24 hours.

* * * * *